US009497591B1

United States Patent
Gotoh et al.

(10) Patent No.: US 9,497,591 B1
(45) Date of Patent: *Nov. 15, 2016

(54) MANAGEMENT OF MOVING OBJECTS

(71) Applicant: International Business Machines Corporation, Armonk, NY (US)

(72) Inventors: Yasuhisa Gotoh, Yokohama (JP); Yasutaka Nishimura, Yamato (JP); Takahito Tashiro, Higashi-kurume (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,316

(22) Filed: Jul. 17, 2015

Related U.S. Application Data

(63) Continuation of application No. 14/744,071, filed on Jun. 19, 2015.

(51) Int. Cl.
H04W 24/00 (2009.01)
H04W 4/02 (2009.01)

(52) U.S. Cl.
CPC ............. *H04W 4/021* (2013.01); *H04W 4/023* (2013.01)

(58) Field of Classification Search
CPC ............................ H04W 4/021; H04W 4/023
USPC ...................................................... 455/456.3
See application file for complete search history.

(56) References Cited

U.S. PATENT DOCUMENTS

| 5,504,482 | A | 4/1996 | Schreder |
| 6,028,550 | A | 2/2000 | Froeberg et al. |
| 6,150,961 | A | 11/2000 | Alewine et al. |
| 7,395,151 | B2 | 7/2008 | O'Neill et al. |
| 7,447,588 | B1 | 11/2008 | Xu et al. |
| 7,689,348 | B2 | 3/2010 | Boss et al. |
| 7,710,421 | B2 | 5/2010 | Muramatsu |
| 7,899,611 | B2 | 3/2011 | Downs et al. |
| 7,979,172 | B2 | 7/2011 | Breed |
| 8,000,887 | B2 | 8/2011 | Nathan et al. |
| 8,396,652 | B2 | 3/2013 | Nomura |
| 8,428,876 | B2 | 4/2013 | Lee |
| 8,620,510 | B1 | 12/2013 | Meuth et al. |
| 8,768,012 | B2 | 7/2014 | Satoh |

(Continued)

FOREIGN PATENT DOCUMENTS

| CN | 102147260 A | 8/2011 |
| CN | 102231231 A | 11/2011 |

(Continued)

OTHER PUBLICATIONS

IBM, "List of IBM Patents or Patent Applications Treated as Related (Appendix P)," Mar. 28, 2016, p. 1-3.

(Continued)

*Primary Examiner* — Nader Bolourchi
(74) *Attorney, Agent, or Firm* — Erik K. Johnson

(57) ABSTRACT

A system comprising a plurality of first subsystems respectively operable to manage a plurality of first regions in a geographic space; and a plurality of second subsystems respectively operable to manage a plurality of second regions in the geographic space, wherein the plurality of first regions and the plurality of second regions are arranged such that at least one of the first regions covers a border of one or more of the second regions and at least of the second regions covers a border of one or more of the first regions.

14 Claims, 12 Drawing Sheets

(56) References Cited

U.S. PATENT DOCUMENTS

| | | | |
|---|---|---|---|
| 8,799,246 B2 | 8/2014 | Nomura et al. | |
| 8,818,608 B2 | 8/2014 | Cullinane et al. | |
| 8,850,013 B2 | 9/2014 | Waldman et al. | |
| 8,862,146 B2 | 10/2014 | Shatsky et al. | |
| 8,930,269 B2 | 1/2015 | He et al. | |
| 8,988,252 B2 | 3/2015 | Scholl et al. | |
| 9,079,587 B1 | 7/2015 | Rupp et al. | |
| 9,120,484 B1 | 9/2015 | Ferguson et al. | |
| 2005/0065711 A1 | 3/2005 | Dahlgren et al. | |
| 2007/0109303 A1 | 5/2007 | Muramatsu | |
| 2007/0241932 A1 | 10/2007 | Otero et al. | |
| 2008/0046134 A1 | 2/2008 | Bruce et al. | |
| 2009/0070024 A1 | 3/2009 | Burchard et al. | |
| 2009/0248758 A1 | 10/2009 | Sawai et al. | |
| 2009/0287405 A1 | 11/2009 | Liu et al. | |
| 2009/0327918 A1 | 12/2009 | Aaron et al. | |
| 2010/0036595 A1 | 2/2010 | Coy et al. | |
| 2010/0188265 A1 | 7/2010 | Hill et al. | |
| 2010/0199213 A1 | 8/2010 | Suzuki | |
| 2011/0037619 A1 | 2/2011 | Ginsberg et al. | |
| 2011/0205040 A1 | 8/2011 | Van Wiemeersch et al. | |
| 2011/0276692 A1* | 11/2011 | Waldman | G06F 9/5083 709/226 |
| 2012/0083960 A1 | 4/2012 | Zhu et al. | |
| 2012/0092187 A1 | 4/2012 | Scholl et al. | |
| 2012/0123677 A1 | 5/2012 | Shimotani et al. | |
| 2012/0291049 A1 | 11/2012 | Park et al. | |
| 2013/0006925 A1 | 1/2013 | Sawai et al. | |
| 2013/0204524 A1 | 8/2013 | Fryer et al. | |
| 2013/0214939 A1 | 8/2013 | Washlow et al. | |
| 2013/0321397 A1 | 12/2013 | Chen et al. | |
| 2014/0120953 A1 | 5/2014 | Ingram et al. | |
| 2014/0136099 A1 | 5/2014 | Choi et al. | |
| 2014/0191858 A1 | 7/2014 | Morgan et al. | |
| 2014/0195214 A1 | 7/2014 | Kozloski et al. | |
| 2014/0236414 A1 | 8/2014 | Droz et al. | |
| 2014/0248899 A1 | 9/2014 | Emadzadeh et al. | |
| 2014/0278026 A1 | 9/2014 | Taylor | |
| 2014/0278029 A1 | 9/2014 | Tonguz et al. | |
| 2014/0289267 A1 | 9/2014 | Felix et al. | |
| 2015/0051822 A1 | 2/2015 | Joglekar | |
| 2015/0066284 A1 | 3/2015 | Yopp | |
| 2015/0120083 A1 | 4/2015 | Gurovich et al. | |
| 2015/0149019 A1 | 5/2015 | Pilutti et al. | |
| 2015/0179077 A1 | 6/2015 | Morgan et al. | |
| 2015/0344038 A1 | 12/2015 | Stenneth et al. | |
| 2015/0346718 A1 | 12/2015 | Stenneth | |
| 2016/0075332 A1 | 3/2016 | Edo-Ros | |

FOREIGN PATENT DOCUMENTS

| | | | |
|---|---|---|---|
| CN | 102997928 A | 3/2013 | |
| CN | 103247176 A | 8/2013 | |
| CN | 103258043 A | 8/2013 | |
| CN | 103971529 A | 8/2014 | |
| DE | 10030819 A1 | 1/2002 | |
| DE | 102005020154 A1 | 11/2006 | |
| EP | 1914701 A2 | 4/2008 | |
| JP | 11083511 A | 3/1999 | |
| JP | 2001028004 A | 1/2001 | |
| JP | 2007286706 A | 11/2007 | |
| JP | 2008123197 A | 5/2008 | |
| JP | 2008123325 A | 5/2008 | |
| JP | 2008262418 A | 10/2008 | |
| JP | 2008294921 A | 12/2008 | |
| JP | 2009277078 A | 11/2009 | |
| JP | 2011158339 A | 8/2011 | |
| JP | 4985119 B2 | 7/2012 | |
| JP | 2012150515 A | 8/2012 | |
| JP | 2012155286 A | 8/2012 | |
| JP | 2013045242 A | 3/2013 | |
| JP | 2013101119 A | 5/2013 | |
| JP | 2013101120 A | 5/2013 | |
| JP | 2014065362 A | 4/2014 | |
| JP | 2014075008 A | 4/2014 | |
| JP | 2014095663 A | 5/2014 | |
| JP | 2015018396 A | 1/2015 | |
| JP | 2015081057 A | 4/2015 | |
| KR | 101354607 B1 | 1/2014 | |
| WO | 2007140527 A1 | 12/2007 | |
| WO | 2011081157 A1 | 7/2011 | |
| WO | 2012167174 A1 | 12/2012 | |
| WO | 2013167085 A2 | 11/2013 | |

OTHER PUBLICATIONS

Gotoh et al., "Geographic Space Management," Application and Drawings, Filed on Jun. 19, 2015, p. 1-97, U.S. Appl. No. 14/744,052.

Gotoh et al., "Geographic Space Management," Application and Drawings, Filed on Jun. 25, 2015, p. 1-95, U.S. Appl. No. 14/750,298.

Gotoh et al., "Geographic Space Management," Application and Drawings, Filed on Jun. 25, 2015, p. 1-95, U.S. Appl. No. 14/750,334.

Gotoh et al., "Geographic Space Management," Application and Drawings, Filed on Jul. 8, 2015, p. 1-93, U.S. Appl. No. 14/793,934.

Gotoh et al., "Geographic Space Management," Application and Drawings, Filed on Jun. 19, 2015, p. 1-95, U.S. Appl. No. 14/744,056.

Gotoh et al., "Geographic Space Management," Application and Drawings, Filed on Jul. 16, 2015, p. 1-92, U.S. Appl. No. 14/800,774.

Gotoh et al., "Geographic Space Management," Application and Drawings, Filed on Jul. 16, 2015, p. 1-92, U.S. Appl. No. 14/800,782.

Gotoh et al., "Geographic Space Management," Application and Drawings, Filed on Jun. 19, 2015, p. 1-94, U.S. Appl. No. 14/744,066.

Gotoh et al., "Geographic Space Management," Application and Drawings, Filed on Jul. 16, 2015, p. 1-91, U.S. Appl. No. 14/800,795.

Gotoh et al., "Geographic Space Management," Application and Drawings, Filed on Jul. 16, 2015, p. 1-91, U.S. Appl. No. 14/800,811.

Gotoh et al., "Geographic Space Management," Application and Drawings, Filed on Jun. 19, 2015, p. 1-93, U.S. Appl. No. 14/744,067.

Gotoh et al., "Geographic Space Management," Application and Drawings, Filed on Jul. 16, 2015, p. 1-91, U.S. Appl. No. 14/800,821.

Gotoh et al., "Geographic Space Management," Application and Drawings, Filed on Jul. 16, 2015, p. 1-91, U.S. Appl. No. 14/800,839.

Gotoh et al., "Management of Moving Objects," Application and Drawings, Filed on Jun. 19, 2015, p. 1-46, U.S. Appl. No. 14/744,071.

Gotoh et al., "Management of Moving Objects," Application and Drawings, Filed on Jul. 17, 2015, p. 1-46, U.S. Appl. No. 14/802,289.

Gotoh et al., "Management of Moving Objects," Application and Drawings, Filed on Jul. 17, 2015, p. 1-46, U.S. Appl. No. 14/802,316.

Yamamoto, "Management of Moving Objects," Application and Drawings, Filed on Jun. 19, 2015, p. 1-59, U.S. Appl. No. 14/744,074.

Yamamoto, "Management of Moving Objects," Application and Drawings, Filed on Jul. 17, 2015, p. 1-58, U.S. Appl. No. 14/802,343.

Yamamoto, "Management of Moving Objects," Application and Drawings, Filed on Jul. 17, 2015, p. 1-58, U.S. Appl. No. 14/802,361.

Gotoh et al., "Management of Events and Moving Objects," Application and Drawings, Filed on Jul. 7, 2015, p. 1-69, U.S. Appl. No. 14/792,805.

Gotoh et al., "Management of Events and Moving Objects," Application and Drawings, Filed on Jul. 16, 2015, p. 1-68, U.S. Appl. No. 14/801,014.

(56) References Cited

OTHER PUBLICATIONS

Gotoh et al., "Management of Events and Moving Objects," Application and Drawings, Filed on Jul. 16, 2015, p. 1-68, U.S. Appl. No. 14/801,054.
Miyahira et al., "Management of Mobile Objects and Service Platform for Mobile Objects," Applications and Drawings, Filed on Dec. 16, 2015, p. 1-69, U.S. Appl. No. 14/970,596.
Nishimura et al., "Management of Dynamic Events and Moving Objects," Application and Drawings, Filed on Dec. 16, 2015, p. 1-92, U.S. Appl. No. 14/970,600.
Ishikawa et al., "Management of Evacuation With Mobile Objects," Application and Drawings, Filed on Dec. 16, 2015, p. 1-50, U.S. Appl. No. 14/970,609.
Gotoh et al., "Geographic Space Management," Application and Drawings, Filed on Dec. 16, 2015, p. 1-72, U.S. Appl. No. 14/970,616.
Ishikawa et al., "Management of Mobile Objects and Resources," Application and Drawings, Filed on Dec. 16, 2015, p. 1-52, U.S. Appl. No. 14/970,626.
Gotoh et al., "Management of Mobile Objects," Application and Drawings, Filed on Dec. 16, 2015, p. 1-65, U.S. Appl. No. 14/970,631.
Ishikawa et al., "Management of Mobile Objects," Application and Drawings, Filed on Dec. 16, 2015, p. 1-78, U.S. Appl. No. 14/970,643.
IBM, "List of IBM Patents or Patent Applications Treated as Related (Appendix P)," Aug. 12, 2015, p. 1-3.
Gotoh et al., "Geographic Space Management," Filed on Jun. 19, 2015, p. 1-97, U.S. Appl. No. 14/744,052.
Gotoh et al., "Geographic Space Management," Filed on Jun. 25, 2015, p. 1-95, U.S. Appl. No. 14/750,298.
Gotoh et al., "Geographic Space Management," Filed on Jun. 25, 2015, p. 1-95, U.S. Appl. No. 14/750,334.
Gotoh et al., "Geographic Space Management," Filed on Jul. 8, 2015, p. 1-93, U.S. Appl. No. 14/793,934.
Gotoh et al., "Geographic Space Management," Filed on Jun. 19, 2015, p. 1-95, U.S. Appl. No. 14/744,056.
Gotoh et al., "Geographic Space Management," Filed on Jul. 16, 2015, p. 1-92, U.S. Appl. No. 14/800,774.
Gotoh et al., "Geographic Space Management," Filed on Jul. 16, 2015, p. 1-92, U.S. Appl. No. 14/800,782.
Gotoh et al., "Geographic Space Management," Filed on Jun. 19, 2015, p. 1-94, U.S. Appl. No. 14/744,066.
Gotoh et al., "Geographic Space Management," Filed on Jul. 16, 2015, p. 1-91, U.S. Appl. No. 14/800,795.
Gotoh et al., "Geographic Space Management," Filed on Jul. 16, 2015, p. 1-91, U.S. Appl. No. 14/800,811.
Gotoh et al., "Geographic Space Management," Filed on Jun. 19, 2015, p. 1-93, U.S. Appl. No. 14/744,067.
Gotoh et al., "Geographic Space Management," Filed on Jul. 16, 2015, p. 1-91, U.S. Appl. No. 14/800,821.
Gotoh et al., "Geographic Space Management," Filed on Jul. 16, 2015, p. 1-91, U.S. Appl. No. 14/800,839.
Gotoh et al., "Management of Moving Objects," Filed on Jun. 19, 2015, p. 1-46, U.S. Appl. No. 14/744,071.
Gotoh et al., "Management of Moving Objects," Filed on Jul. 17, 2015, p. 1-46, U.S. Appl. No. 14/802,289.
Gotoh et al., "Management of Moving Objects," Filed on Jul. 17, 2015, p. 1-46, U.S. Appl. No. 14/802,316.
Yamamoto, "Management of Moving Objects," Filed on Jun. 19, 2015, p. 1-59, U.S. Appl. No. 14/744,074.
Yamamoto, "Management of Moving Objects," Filed on Jul. 17, 2015, p. 1-58, U.S. Appl. No. 14/802,343.
Yamamoto, "Management of Moving Objects," Filed on Jul. 17, 2015, p. 1-58, U.S. Appl. No. 14/802,361.
Gotoh et al., "Management of Events and Moving Objects," Filed on Jul. 7, 2015, p. 1-69, U.S. Appl. No. 14/792,805.
Gotoh et al., "Management of Events and Moving Objects," Filed on Jul. 16, 2015, p. 1-68, U.S. Appl. No. 14/801,014.
Gotoh et al., "Management of Events and Moving Objects," Filed on Jul. 16, 2015, p. 1-68, U.S. Appl. No. 14/801,054.
Abrougui et al., "Efficient load balancing and QoS-based location aware service discovery protocol for vehicular ad hoc networks," EURASIP Journal on Wireless Communications and Networking, Mar. 2012, p. 1-15, Springer.
Aulinas et al., "Local map update for large scale SLAM," Electronics Letters, Apr. 15, 2010, p. 1-2, vol. 46, No. 8.
Dangel et al., "Can Road Traffic Volume Information Improve Partitioning for Distributed SUMO?," Modeling Mobility with Open Data, Lecture Notes in Mobility, 2015, p. 61-74, Springer International Publishing.
DRM, "Local Dynamic Map," DRM Research Seminar, Jun. 30, 2010, p. 1-72, Japan Digital Road Map Association.
Hong et al., "A grid-based node split algorithm for managing current location data of moving objects," The Journal of Supercomputing, Dec. 2007, p. 321-337, vol. 42, Issue 3, Springer.
Hsu et al., "Automatic Traffic Monitoring Method Based on Cellular Model," Fifth International Conference on Intelligent Information Hiding and Multimedia Signal Processing, 2009, p. 640-643, IEEE Computer Society.
Ihm et al., "Advanced Spatial Data Management for Enterprise Applications," An Oracle White Paper, Aug. 2010, p. 1-16, Oracle Spatial 11g.
Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Schade, "Sharing Data by Means of a Local Dynamic Map," Understanding the Standards for Cooperative ITS, Feb. 6, 2014, p. 1-10, MINES ParisTech, Transportation Sustainability Environment Consulting.
Suzumura et al., "X10-based Massive Parallel Large-Scale Traffic Flow Simulation," ProVISION, Winter 2012, p. 74-79, No. 72, IBM Professionals' Papers.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
IEEE, "Server—Definition," IEEE 100: The Authoritative Dictionary of IEEE Standards Terms, 2000, p. 1031, Seventh Edition.
IEEE, "System—Definition," IEEE 100: The Authoritative Dictionary of IEEE Standards Terms, 2000, p. 1143-1144, Seventh Edition.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Y et al., "A Complex Event Processing System Approach to Real Time Road Traffic Event Detection," Journal of Convergence Information Technology (JCIT), Oct. 2013, p. 142-148, vol. 8, No. 15.

\* cited by examiner

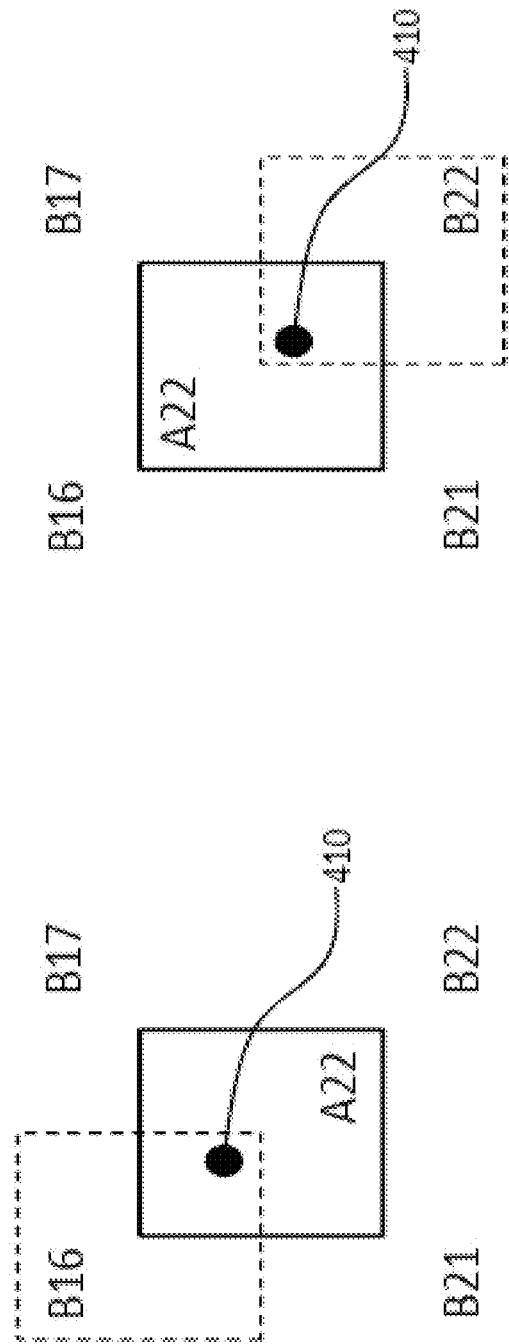

MANAGEMENT OF MOVING OBJECTS

BACKGROUND

The present invention relates to a system for managing geographic space and moving objects thereon.

As the geographic space being handled by a driving system expands, the amount of information being transmitted and received increases due to an increase in the number of automobiles and the number of roads, and the corresponding requirements might exceed the processing power of a single server. Even if the geographic space is divided and a plurality of servers are used to process the spaces resulting from the division, automobiles move at high speeds among the plurality of divided geographic spaces, and therefore further communication between the servers is necessary, such that the communication load between servers increases. In particular, when vehicles exist in one geographic space near the border of another geographic space, a server managing the one geographic space needs information of the other geographic space from another server in order to locate a car near the border, and thus communication between servers increases. Meanwhile, a redundancy of subsystems is necessary in case of failure.

SUMMARY

An aspect of the innovations herein provides a system comprising, a plurality of first subsystems respectively operable to manage a plurality of first regions in a geographic space; and a plurality of second subsystems respectively operable to manage a plurality of second regions in the geographic space, wherein the plurality of first regions and the plurality of second regions are arranged such that at least one of the first regions covers a border of at least one of the second regions and at least of the second regions covers a border of at least one of the first regions.

A second aspect of the invention may include a computer-implemented method performed by the apparatus of the first aspect. A third aspect of the invention may include a computer program product comprising a non-transitory computer readable storage medium having program instructions embodied therewith, the program instructions executable by a computer to cause the computer to perform the method of the second aspect.

The summary clause does not necessarily describe all necessary features of the embodiments of the present invention. The present invention may also be a sub-combination of the features described above. The foregoing and other features of the present invention will become more apparent from the following detailed description taken in conjunction with the accompanying drawings.

BRIEF DESCRIPTION OF THE SEVERAL VIEWS OF THE DRAWINGS

FIG. 5C shows the regions and the moving object 410 after the embodiment of FIG. 5A.

FIG. 5D shows the regions and the moving object 410 after the embodiment of FIG. 5C.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
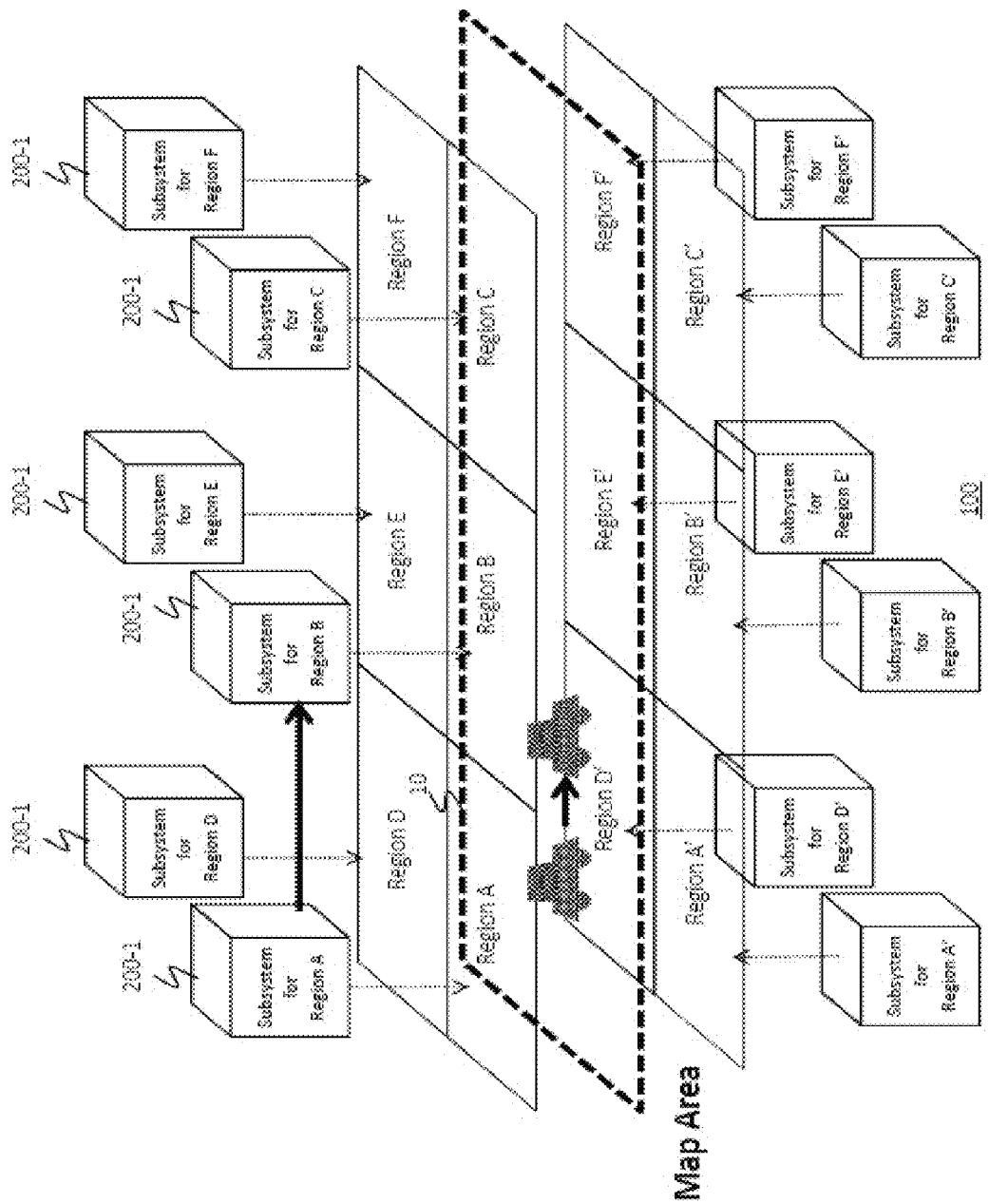
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a moving object 10 moves. The system 100 is operable to divide the geographic space into a plurality of regions, manage these regions, and dynamically change the boundary of at least one of the regions, which may improve the overall system efficiency. The moving object 10 may be a moving object that moves on routes including land routes, sea routes, and/or air routes, for example. The geographic space may be land, sea, or air space that includes the routes on which the moving object travels.

FIG. 1 shows an automobile as an example of the moving object 10, which moves along roads as examples of land routes. FIG. 1 shows an example in which the system 100 performs management by using map areas corresponding to a geographical area including a road on which the automobile is moving. The system 100 divides the map area into a plurality of first regions and a plurality of second regions and includes a plurality of first subsystems 200-1 and a plurality of second subsystems 200-2 that respectively manage these first regions and second regions. Hereinafter the term "subsystem 200" may be used to indicate any one or both of the first subsystems 200-1 and the second subsystems 200-2. With the first subsystems 200-1 and the second sub-systems 200-2, the system 100 secures redundancy. FIG. 1 shows an example in which the map area is divided into six first regions from region A to region F, and six first subsystems 200-1 respectively manage these six first regions resulting from the division. The map area is also divided into six second regions from first region A' to region F', and six second subsystems 200-2 respectively manage these six second regions resulting from the division. According to this embodiment, the first regions A-F are different from the second regions A'-F'. Thus the first subsystems 200-1 manage different regions from the regions managed by the second subsystems 200-2. The details of the first and second regions managed by the first subsystems 200-1 and second subsystems 200-2 are explained below.

Each of the subsystems 200 may be implemented on a server, and portions of the system 100 other than the subsystems may also be implemented on one or more servers. In other words, the system 100 may be implemented on a plurality of servers. These servers may exist at any point on a network including the Internet, a subscriber network, a cellular network, or a desired combination of networks. The servers may be dedicated servers, or may be shared servers that perform other operations.

The system 100 acquires the positions of a moving object 10 from the moving object 10, and the subsystem 200 managing the region that includes the acquired position of the moving object 10 within the map area may manage the movement of this moving object 10. The system 100 acquires information such as events that have occurred to the moving object 10 and/or on the road outside, and the subsystem 200 managing the region including the position where such an event has occurred may manage the state of the event. Events may include information about accidents, obstructions, or construction on the road, or information about the weather, temperature, buildings, shops, or parking lots near the road. In response to a setting or a request from the moving object 10, the subsystem 200 may provide notification about the event information to the moving object 10 that made the request.

For example, if the moving object 10 is moving on a route in a geographical area corresponding to region A and region A', then the first subsystem 200-1 managing region A and the second subsystem 200-2 managing region A' manage this moving object 10. The system 100 may increase or decrease the number of first subsystems 200-1 and/or second subsystems 200-2 according to the surface area of the geographic space to be managed.

Since the map area is divided into a plurality of regions, despite the moving object 10 simply moving on a route, the region corresponding to the position of the moving object 10 might change. FIG. 1 shows an example in which the moving object 10 is driving on a road such that the position of the moving object 10 moves from region A to region B in the first regions but remains in the same region in the second regions. In this case, according to the movement of the moving object 10, the system 100 may transfer the information concerning the moving object 10 from the first subsystem 200-1 managing region A to the first subsystem 200-1 managing region B, and may also transfer the management of the moving object 10 to the first subsystem 200-1 managing region B.

Figure 2:
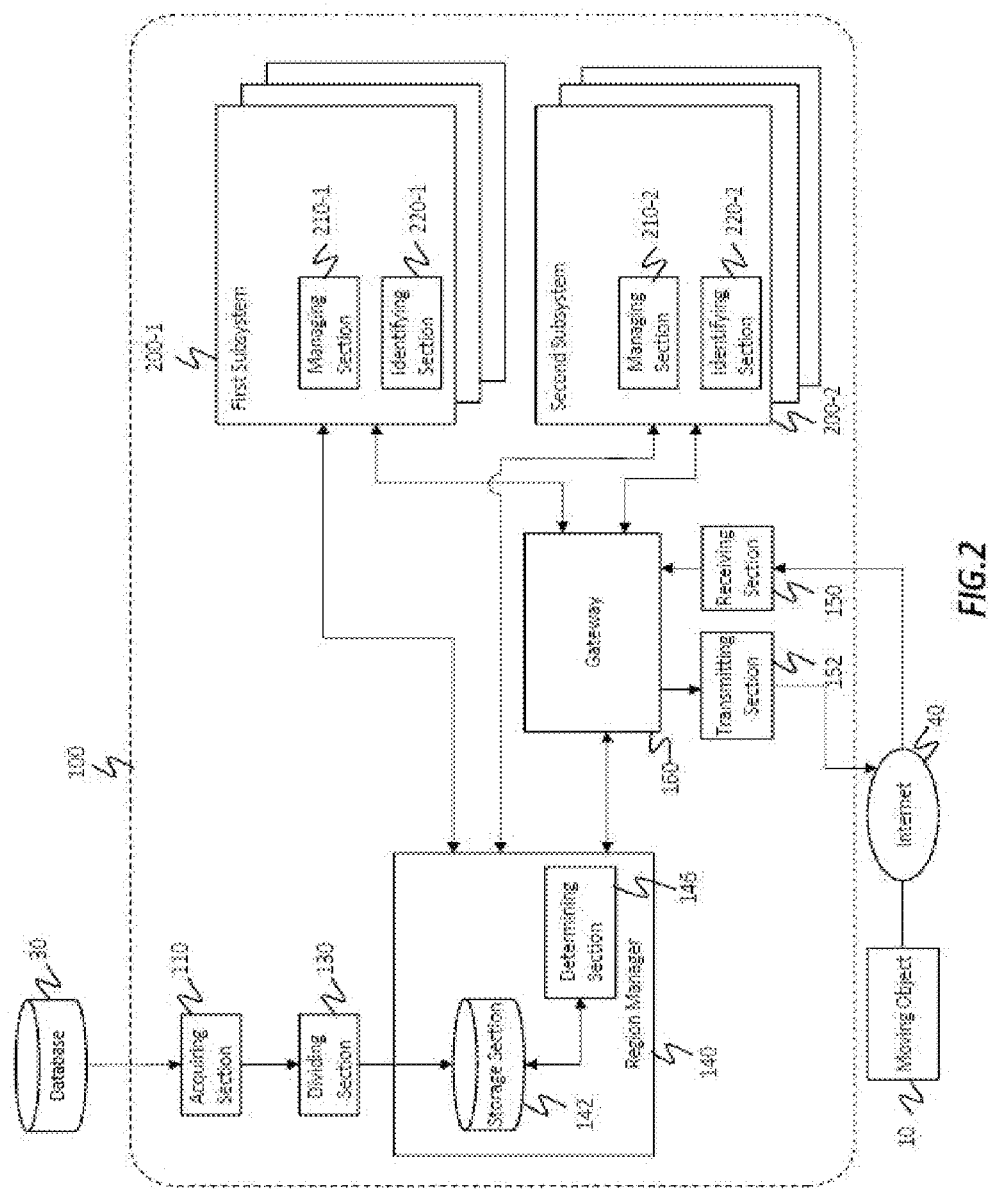
FIG. 2 shows a first exemplary configuration of the system 100 according to the present embodiment.

FIG. 2 shows an exemplary configuration of the system 100, according to an embodiment of the present invention. The system 100 may be operable to communicate with each of a plurality of moving objects 10 to send and receive the information used to manage the moving objects 10. The system 100 may be operable to acquire map data and/or information exchanged with the moving objects 10, through the Internet, a subscriber network, a cellular network, or any desired combination of networks. The system 100 includes an acquiring section (i.e., module) 110, a dividing section 130, a region manager 140, a receiving section 150, a transmitting section 152, a gateway apparatus 160, a plurality of first subsystems 200-1, and a plurality of second subsystems 200-2.

The acquiring section 110, the dividing section 130, the region manager 140, the transmitting section 152, the receiving section 150, the gateway 160, the first subsystems 200-1, and the second subsystems 200-2 may be each independent hardware, or modules of one or more of hardware modules.

The acquiring section 110 may be operable to acquire map data corresponding to the geographical areas where a moving object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of first regions, and dividing the same original map area into a plurality of second regions. The plurality of first regions and the plurality of second regions may be arranged to cover different regions on the original map area. The dividing section 130 may divide the map area into a number of first/second regions that is less than the number of first/second subsystems 200-1/200-2. The dividing section 130 may store the information concerning the first regions and second regions resulting from the division in the storage section 142. The details of the arrangement of the first regions and the second regions are explained below.

The region manager 140 may be operable to store information concerning the plurality of regions including the first regions and the second regions resulting from the division. The region manager 140 may be operable to specify the first subsystem 200-1 managing the first region that includes the position of the moving object 10, and the second subsystem 200-2 managing the second region that includes the position of the moving object 10, according to the position of the moving object 10. The region manager 140 may be implemented on one or more servers. The region manager 140 includes a storage section 142, and a determining section 146.

The storage section 142 may be operable to communicate with the dividing section 130 and store information concerning the plurality of first regions and the plurality of second regions resulting from the division by the dividing section 130. The storage section 142 may store setting values or the like of the system 100. The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine a candidate first subsystem 200-1 from the plurality of the first subsystems 200-1 for each of the moving objects 10 based on the position information of the each moving object 10 and information of the plurality of first regions. The determining section 146 may also be operable to determine a candidate second subsystem 200-2 from the plurality of the second subsystems 200-2 for each of the moving objects 10 based on the position information of the each moving object 10 and information of the plurality of second regions. Each candidate first subsystem 200-1 is to manage each target moving object 10 on its managing first region and each candidate second subsystem 200-2 is to manage each target moving object 10 on its managing second region. The determining section 146 may identify a position in the map area managed by the system 100 that corresponds to the position information of the moving object 10.

The determining section 146 may determine the first subsystem 200-1 that manages the first region including the identified position in the map area to be the candidate first subsystem 200-1 for managing this moving object 10 as well as the second subsystem 200-2 that manages the second region including the identified position in the map area to be the candidate second subsystem 200-1 for managing this moving object 10. The determining section 146 may store the position information of this moving object 10 and/or information of the determined candidate first/second subsystems 200-1/200-2 in the storage section 142, in association with this moving object 10. The determining section 146 may store a history of the position information of this moving object 10 and/or a history of the determined first/second candidate subsystems 200-1/200-2 in the storage section 142.

The determining section 146 may further select a main subsystem for managing a moving object 10 from among a candidate first subsystem 200-1 of the plurality of first subsystems 200-1 and a candidate second subsystem 200-2 of the plurality of second subsystems 200-2, based on the location of the moving object 10 within the first region managed by the candidate first subsystem 200-1 and the second region managed by the candidate second subsystem 200-2. The determining section 146 may store the position information of this moving object 10 and/or information of the main subsystem in the storage section 142, in association with this moving object 10. The determining section 146 may store a history of the position information of this moving object 10 and/or a history of the main subsystem in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of moving objects 10. Each moving object 10 may transmit information at designated time intervals, and the receiving section 150 may sequentially receive this transmitted information. The receiving section 150 may receive position information of the moving objects 10 and event information observed by the moving objects 10. The receiving section 150 may be operable to receive, as position information, observation information of a moving object 10 that is observed by other moving objects 10. The position information may be information that represents longitude and latitude in an absolute coordinate system, distance and direction from a reference point, etc. The position information may include height (altitude) information. The receiving section 150 may acquire the absolute position information or relative position information of the moving object 10.

The receiving section 150 may receive an observation position observed by the moving object 10 using GPS. The receiving section 150 may receive the observation information detected by the moving object 10 using a geomagnetic sensor, for example. The receiving section 150 may communicate with the plurality of moving objects 10 and receive the position information of each moving object 10, via the Internet 40. The receiving section 150 may receive the position information of the plurality of moving objects 10 through wireless communication, a subscriber network, a cellular network, or any desired combination of networks.

The transmitting section 152 may be operable to transmit event information to each of the moving objects 10 according to settings, for example. The transmitting section 152 may transmit information concerning the route on which the moving object 10 is expected to travel. The transmitting section 152 may communicate with the moving objects 10 and transmit each type of information to the moving objects 10 via the Internet 40. The transmitting section 152 may transmit each type of information to the moving objects 10 through wireless communication, a subscriber network, a cellular network, or any desired combination of networks.

The gateway apparatus 160 may be operable to transfer communication between the plurality of subsystems 200 and the plurality of moving objects 10. The gateway apparatus 160 may communicate with the receiving section 150 and receive the information transmitted by each moving object 10. The gateway apparatus 160 may communicate with the region manager 140 and demand, the transfer destination for each piece of information received from the moving objects 10, of the region manager 140. In response to this request, the gateway apparatus 160 may receive from the region manager 140 the information of the candidate first subsystem 200-1 and the candidate second subsystem 200-2 that is to manage the moving object 10 that transmitted the information. The gateway apparatus 160 may transfer the information received from the moving object 10 to the subsystem 200 that is to manage the moving object 10. In other words, the gateway apparatus 160 may transfer the information received from each moving object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the moving objects 10 designated for each subsystem 200.

The gateway apparatus 160 may include a plurality of gateway devices, and may quickly perform transfer between the plurality of subsystems 200 and the plurality of moving objects 10. In this case, the receiving section 150 may function as a load balancer that supplies the information from the moving objects 10, such that the load is spread among the plurality of gateways. The load balancer may sequentially supply information from the moving objects 10 to the gateways having lighter loads. The gateway apparatus 160 may be a network that provides a connection between a plurality of networks using the same or different types of protocols.

A plurality of first subsystems 200-1 are operable to respectively manage a plurality of first regions in a geographic space, and a plurality of second subsystems 200-2 are operable to respectively manage a plurality of second regions in the geographic space. The plurality of first subsystems 200-1 and the plurality of second subsystems 200-2 are operable to manage moving objects 10 that travel routes in the first regions and the second regions, respectively. In one embodiment, a first/second subsystem 200-1/200-2 determined by the determining section 146 as the candidate first/second subsystem for a moving object 10 manages the moving objet 10.

Each candidate first subsystem 200-1 and candidate second subsystem 200-2 may, for example, set managing first/second regions as a management target region, and may map the moving objects 10 that are management targets on a map of its management target region. Each subsystem 200 may be operable to manage events occurring within the management target region, and may manage mapping of these events on the map of this management target region. In this embodiment, only a subsystem 200 selected as the main subsystem for a moving object 10 may provide the moving object 10 in the management target region with the event information. Each subsystem 200 includes a managing section 210-1/210-2 (also referred to herein as simply a managing section 210) and an identifying section 220-1/220-2 (also referred to herein as simply an identifying section 220).

The managing section 210 provided in one subsystem 200 may manage the route information of the first/second region managed by this subsystem 200, i.e. individual route information. The identifying section 220 provided in one subsystem 200 may identify the routes within the individual route information on which a moving object 10 is positioned, based on the position information received from the moving objects 10 in the first/second region managed by this subsystem 200. In other words, the managing section 210 and the identifying section 220 may map the management target moving objects 10 on a map of the management target region, based on the position information received from the moving objects 10. The subsystem 200 may include a function known as LDM (Local Dynamic Map), by using the managing section 210 and the identifying section 220. Each of the managing unit 210, and identifying section 220, may be a circuit, a shared or dedicated computer readable medium storing computer readable program instructions executable by a shared or dedicated processor, etc.

The system 100 of the present embodiment described above may manage a map area containing first/second regions obtained by dividing a geographic space for a plurality of first subsystems 200-1 and a plurality of second subsystems 200-2, along with moving objects 10 and events positioned within this map area. Thereby, the system 100 can manage a whole geographic space in a redundant manner with the first subsystems 200-1 and the second subsystems 200-2.

Figure 3:
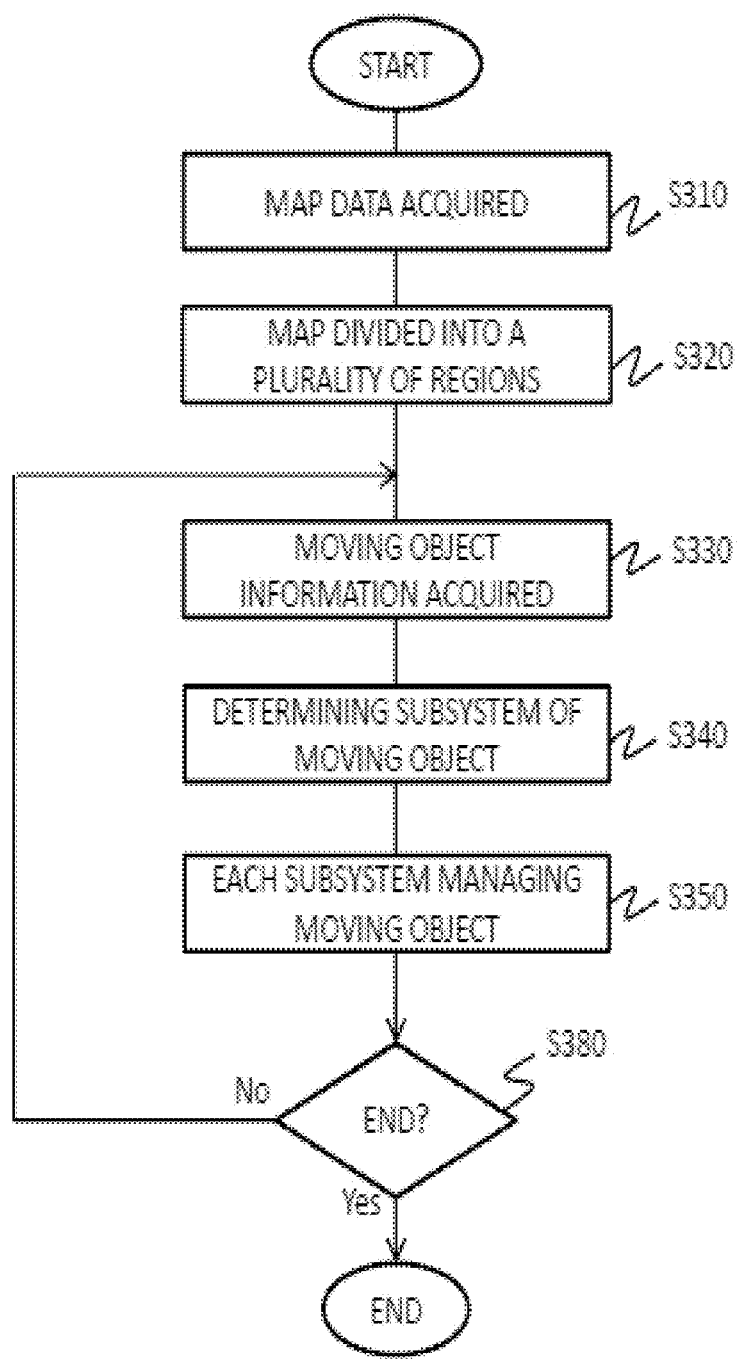
FIG. 3 shows an operational flow of the first exemplary configuration of the system 100 according to the present embodiment.

FIG. 3 shows an operational flow of a system, according to an embodiment of the present invention. The present embodiment describes an example in which the system performs operations from S310 to S380 shown in FIG. 3 to manage moving objects redundantly with the plurality of first subsystems 200-1 and a plurality of second subsystems 200-2. FIG. 3 shows one example of the operational flow of the system 100 shown in FIGS. 1 and 2, but the system 100 shown in FIGS. 1-2 is not limited to using this operational flow, and the operational flow may be performed by other systems.

First, an acquiring section, such as the acquiring section 110, may acquire the map data of the geographic space to be managed by the system (S310). The acquiring section may acquire map data of a geographic space that includes one or more cities, one or more towns, and the like. The acquiring section may include map data of a geographic space including one or more states, countries, continents, etc.

Next, a dividing section, such as the dividing section, may divide the area of the map data (map area) to generate a plurality of first regions and a plurality of second regions (S320). The plurality of first regions and the plurality of second regions may be arranged such that at least one of the first regions covers a border of one or more of the second regions and at least of the second regions covers a border of one or more of the first regions. In particular, the plurality of first regions and the plurality of second regions may be arranged such that each of the first regions covers a border of one or more of the second regions and each of the second regions covers a border of one or more of the first regions.

The dividing section may divide the map area such that each of the first regions covers an intersection point of the borders of at least two second regions and/or each of the second regions covers an intersection point of the borders of at least two first regions. The dividing section may divide the map region such that the size and shape of each of the first regions and each of the second regions are substantially identical. In one embodiment, the first regions and the second regions are quadrangular areas.

Next, a receiving section, such as the receiving section 150, may receive the information transmitted from each of a plurality of moving objects, such as moving object 10 (S330). The receiving section may receive the position information of each moving object. The receiving section may receive information concerning events observed by each of the moving objects, in addition to the position information. The receiving section may supply a gateway apparatus, such as the gateway apparatus 160, with the pieces of received information. The gateway apparatus may request the transfer destination of each piece of received information from the region manager.

Next, in response to the request from the gateway apparatus, a determining section, such as the determining section 146, of the region manager may determine the regions in which the moving objects are positioned among the plurality of first regions and the regions in which the moving objects are positioned among the plurality of second regions, based on the position information received from each of the moving objects, and may determine the candidate first subsystem, such as the first subsystem 200-1, and the candidate second subsystem, such as the second subsystem 200-2, for managing the maps of these regions from among the plurality of subsystems (S340). Specifically, the region manager may determine each region in the map area in which a moving object is positioned, according to the position information of each moving object.

In this embodiment, the determining section may select at least one of candidate first subsystems for a moving object from the plurality of the first subsystems based on the distance between a center of a first region managed by each first subsystem and the location of moving object. For example, the determining section may select one first subsystem that manages the first region closest to the moving object among the plurality of the first regions, from the plurality of the first subsystems as a candidate first subsystem.

The determining section may also select at least one candidate second subsystem for a moving object from the plurality of the second subsystems based on the distance between a center of a second region managed by each second subsystem and the location of moving object. For example, the determining section may select one second subsystem that manages the second region closest to the moving object among the plurality of the second regions, from the plurality of the second subsystems as a candidate second subsystem. Candidate first subsystems and candidate second subsystems may be referred to as "candidate subsystems."

Then, the determining section may select a main subsystem for managing a moving object from among a candidate first subsystem and a candidate second subsystem based on the location of the moving object within the first region managed by the candidate first subsystem and the second region managed by the candidate second subsystem. In this embodiment, the determining section may calculate the distances between the location of the moving object and the center of the first region managed by the candidate first subsystem and the distance between the location of the moving object and the center of the second region managed by the candidate second subsystem, and select the main subsystem based on the distance between the location of the moving object and the center of the first region managed by the candidate first subsystem relative to distance between the location of the moving object and the center of the second region, managed by the candidate second subsystem. Specifically, the determining section may select a closer subsystem from the candidate first subsystem and the candidate second subsystem as the main subsystem.

In another embodiment, the determining section may calculate the distances between the location of the moving object and the nearest border of the first region managed by the candidate first subsystem and the distance between the location of the moving object and the nearest border of the second region managed by the candidate second subsystem, and select the main subsystem based on the distance between the location of the moving object and the border of the first region managed by the candidate first subsystem relative to the distance between the location of the moving object and the border of the second region managed by the candidate second subsystem.

Additionally or alternatively, the determining section may select the main subsystem based on a travelling direction of the moving object. In this embodiment, the determining section may predict a location of the moving object after a time period based on the current location of the moving object and the travelling direction, the travelling route and/or speed of the moving object, calculate the distances between the future location of the moving object and the center or border of the candidate first/second subsystem, and the select the main subsystem based on the calculate distances.

Next, each subsystem manages the moving objects (S350). The gateway apparatus may transfer each piece of received information, with the candidate first and second subsystems (including a main subsystem) corresponding to the position information of the moving object as determined by the region manager serving as the transfer destination. The candidate subsystems may each perform mapping of the received information on a map of the corresponding management target region. Specifically, each candidate subsystem may map the management target moving objects that this candidate subsystem 200 manages, sequentially update the mapping according to position information sequentially transmitted from these moving objects, and manage the movement of these moving objects on the map.

In addition, the candidate subsystem performing as a main subsystem for a moving object may perform a search of a route from the position of the moving object on the map to a position where this moving object will arrive in the future. In one embodiment, each subsystem may search for a route to which the moving object is capable of moving in a time for the moving object for which the subsystem performs as the main subsystem, or may instead search for a route to a position on the map designated by the moving object or a reference position, such as a landmark.

The main subsystem may provide the moving object with information that assists the moving object with traveling in the geographic space. In one embodiment, each subsystem performing as a main subsystem may map management target events on the map managed by the subsystem, and may transmit information concerning these events to the moving objects for which the each subsystem performs as the main subsystem, according to settings or the like. In this way, the subsystems can notify the moving objects about information concerning events occurring at positions near the positions of the moving objects. The subsystems can notify each moving object about information concerning the route relating to the movement direction of the moving object for which the subsystem performs as a main subsystem. The subsystems may provide an application that operates independently from the system with the position information, event information, route information, and the like of each moving object.

Next, the system may determine whether instructions have been received to suspend or stop operation (S370). If the program has ended, instructions have been received from the user of the system, or an emergency stop has occurred, for example (S370: Yes), the system may end the operation.

If instructions for suspending or stopping the operation have not been received, then the system may return to the operation of S330 for receiving information from the moving objects and continue managing the subsystems. Until receiving instructions to suspend or stop the operation, the system may repeatedly perform the operations from S330 to S380 to continue the management of the subsystems while adjusting the loads of the subsystems.

By iterating management operations, such as the loop of operations S330-S380, the system may manage the moving object. During the loop, the determining section may iterate the selection of the candidate subsystems and the main subsystem for each moving object moving from one region to another region.

Figure 4A:
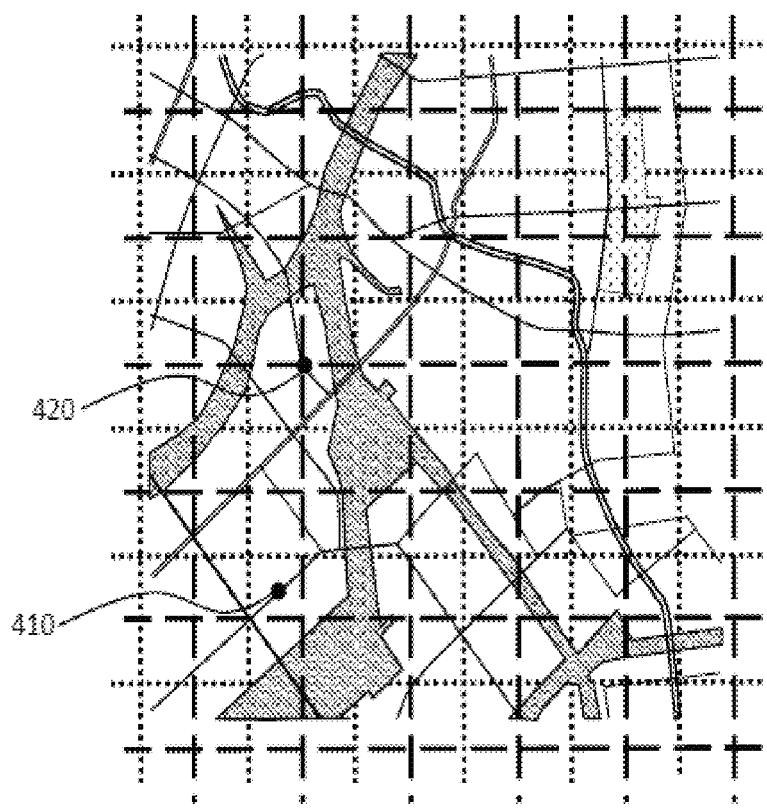
FIG. 4A shows first regions and second regions according to an embodiment of the invention.
Figure 4B:
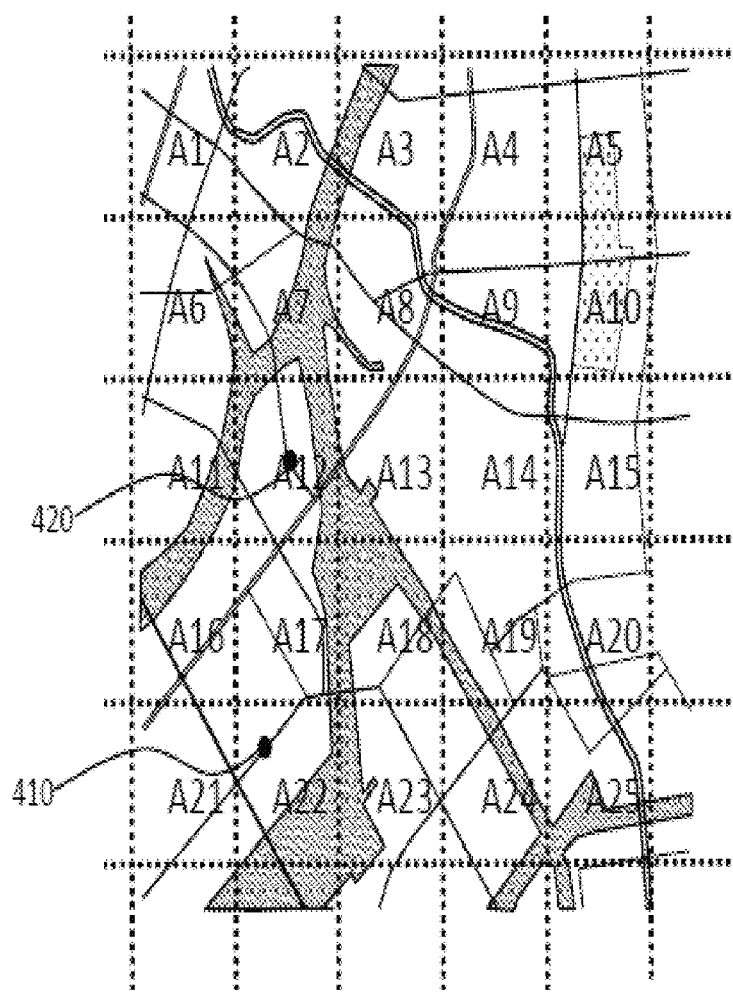
FIG. 4B shows first regions according to the embodiment of FIG. 4A.
Figure 4C:
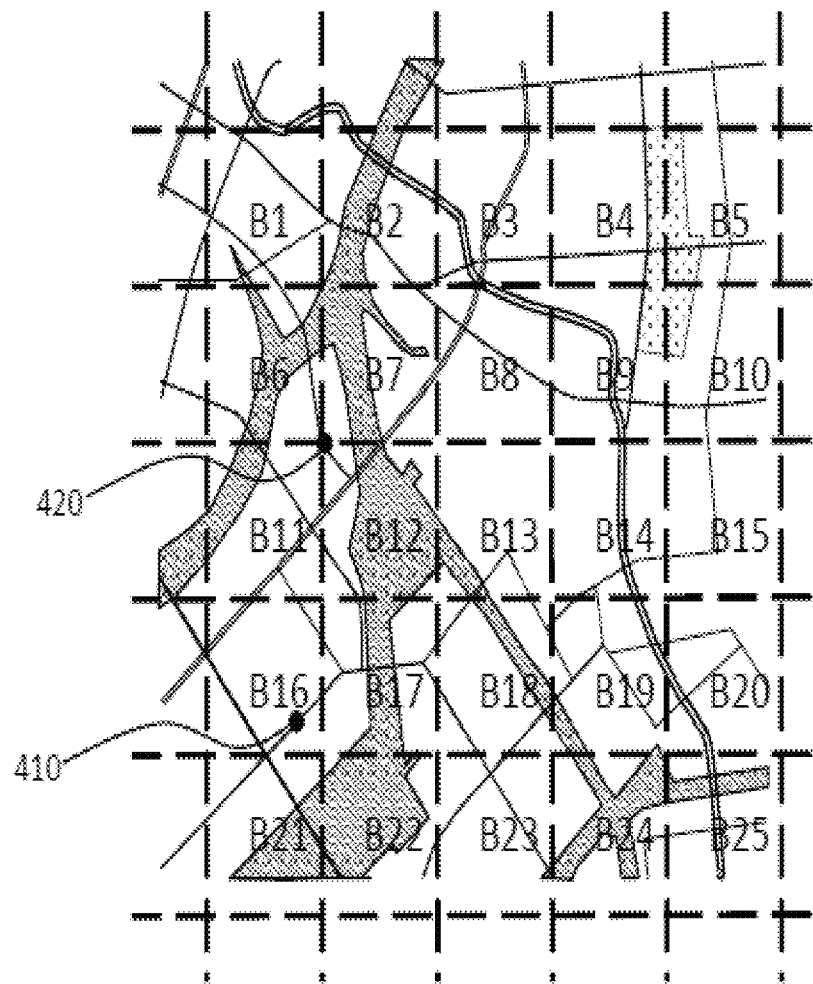
FIG. 4C shows second regions according to the embodiment of FIG. 4A.

FIGS. 4A-C show first regions and second regions, according to an embodiment of the present invention. FIG. 4A shows both first regions and second regions. FIG. 4B shows only first regions. FIG. 4C shows only second regions.

In FIGS. 4A-C, first regions A1-A25 are indicated by dotted lines and second regions B1-B25 are indicated by dashed lines. According to the embodiment, the first regions and the second regions have a quadrangular or a square shape. According to the embodiment, the first regions are arranged to be shifted from the second regions by a half pitch of each region in both a longitudinal direction and in a lateral direction. In the embodiment, borders of the first regions and borders of the second regions are arranged alternately. In this embodiment, one moving object 410 is located both on a first region A22 and a second region B16. Another moving object 420 is located on a first region A12 and at the intersection of borders of second regions B6, B7, B11, and B12. In other words, the moving object 420 is located on the first region A12, the second regions B6, B7, B11, and B12.

Figure 5B:
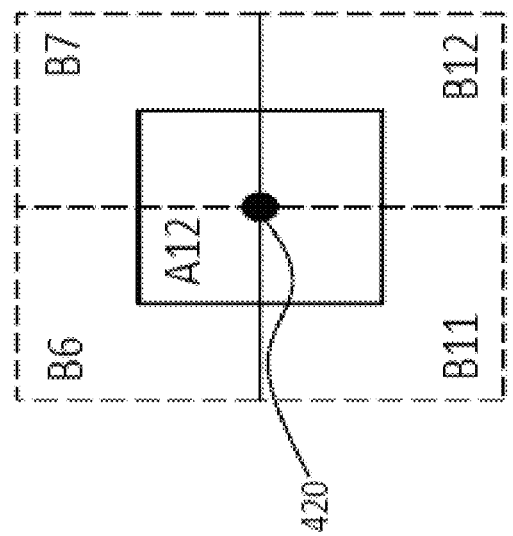
FIG. 5B shows regions managed by candidate subsystems for the moving object 420 according to the embodiment of FIGS. 4A-C.
Figure 5A:
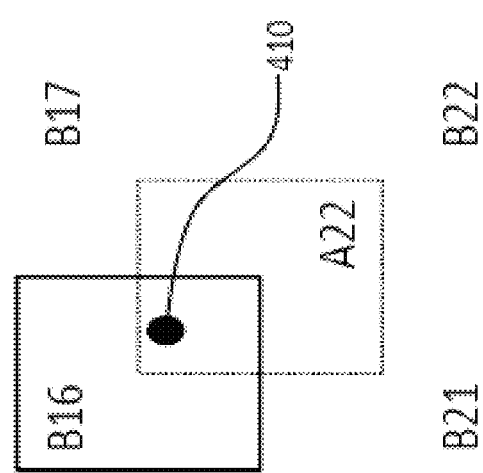
FIG. 5A shows regions managed by candidate subsystems for the moving object 410 according to the embodiment of FIGS. 4A-C.

FIG. 5A shows regions managed by candidate subsystems for the moving object 410, according to the embodiment of FIGS. 4A-C. FIG. 5B shows regions managed by candidate subsystems for the moving object 420, according to the embodiment of FIGS. 4A-C. In this embodiment, the first region A22 is closest to the moving object 410 among the plurality of the first regions A1-25, and the second region B16 is closest to the moving object 410 among the plurality of the second regions B1-25. The determining section selects a candidate first subsystem managing the first region A22 from the plurality of the first subsystems managing the first regions A1-A25, and selects a candidate second subsystem managing the second region B16 from the plurality of the second subsystems managing the second regions B1-B25, for the moving object 410 as shown in FIG. 5A. Then, based on determining that the center of the second region B16 is closer to the moving object 410 than that of the first region A22, the determining section may determine the candidate second subsystem managing the second region B16 as the main subsystem.

Similarly the first region A12 is closest to the moving object 420 among the plurality of the first region A1-25, and the second region B6, B7, B11 and B12 are closest to the moving object 410 among the plurality of the second regions B1-25. Thus, the determining section selects a candidate first subsystem managing the first region A12 from the plurality of the first subsystems managing the first regions A1-A25, and selects candidate second subsystems managing the second regions B6, B7, B11 and B12 from the plurality of the second subsystems managing the second regions B1-B25, for the moving object 420 as shown in FIG. 5B.

In the embodiment of FIG. 5B, the distances between the moving object 420 and the plurality of second regions B6, B7, B11, and B17 may be equal, substantially equal, or deviate within a threshold range. In response to determining that the center of the first region A12 is closer to the moving object 420 than that of the second regions B6, B7, B11, and B12, the determining section may determine the candidate first subsystem managing the second region A12 as the main subsystem. The determining section may determine the candidate first subsystem, the candidate second subsystems, and the main subsystem for each piece of position information of moving objects, and provide notification including information of the determined candidate subsystems and the main subsystem to the gateway apparatus.

In this embodiment, presuming that the moving object 410 in FIG. 5A is moving to a lower right direction, the moving object 410 moves from a point near the center of the second region B16 to a point near center of the first region A22 as shown in FIG. 5C.

FIG. 5C shows the regions and the moving object 410 after movement of the moving object 410 of the embodiment of FIG. 5A. In FIG. 5C, the moving object 410 exists both in the first region A22 and the second region B16, but is closer to the center of the first region A22 than the center of the second region B16. The determining section selects a first subsystem managing the first region A22 as a main subsystem, and a second subsystem managing the second region B16 as a candidate second subsystem.

FIG. 5D shows the regions and the moving object 410 after movement of the moving object 410 of the embodiment of FIG. 5C. In FIG. 5D, the moving object 410 exists both in the first region A22 and the second region B16 but is closer to the center of the first region A22 than the center of the second region B22. The determining section selects a first subsystem managing the first region A22 as a main subsystem again, and a second subsystem managing the second region B16 as a candidate second subsystem.

Figure 5E:
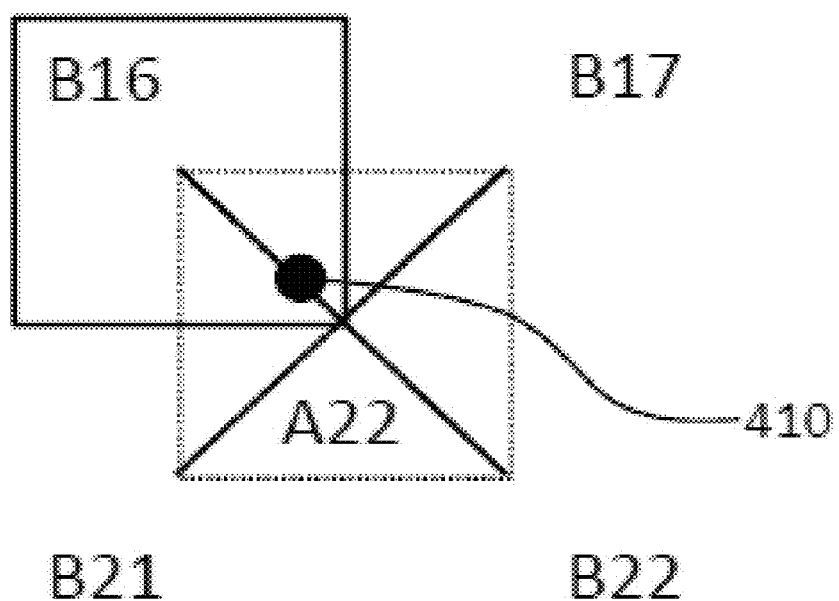
FIG. 5E shows the regions and the moving object 410 in another embodiment.

FIG. 5E shows the regions and the moving object 410 in another embodiment of the present invention. In this embodiment, the moving object 410 exists both in the first region A22 and the second region B16, but a second subsystem managing the second region B16 halts. The determining section may change the main subsystem to the candidate second subsystem if the center of the second region managed by the candidate second subsystem is the second closest to the location of the moving object 410 and the candidate first subsystem is down. In the embodiment of FIG. 5E, the main subsystem (or the candidate first subsystem) managing the first region A22 has suddenly halted. In response, the determining section changes the main subsystem from the first subsystem managing the first region A22 to the second subsystem managing the second region B16, which is operating and the second closest to the location of the moving object 410.

As described above, at least one of the first subsystems and at least one of the second subsystems both manage the moving object thereby providing the system with redundancy.

If the first regions managed by the first subsystems and the second regions managed by the second subsystems are the same, then the system may be wasteful because the first subsystems and the second subsystems would have almost the same data. Furthermore, in such a case, if the moving object travels near a border of two regions, then a subsystem managing one region would always need geographic information of another region for locating the moving object traveling near the border. Thus, communication loads between adjacent subsystems increase in response to the plurality of subsystems conducting handovers of a main subsystem.

However, according to many embodiments, at least one of the first regions managed by the first subsystems covers a border of the second regions managed by the second subsystems, and at least one of the second regions managed by the second subsystems covers a border of the first regions managed by the first subsystems. Thus, the first subsystems and the second subsystems can manage the whole geographic space in an efficient manner.

In addition, a candidate first subsystem managing a first region and a candidate second subsystem managing a second region may have geographic information around the moving object due to conducting a handover of a main subsystem. Thus, a communication load between adjacent subsystems does not increase at the handover of the main subsystem.

Figure 6:
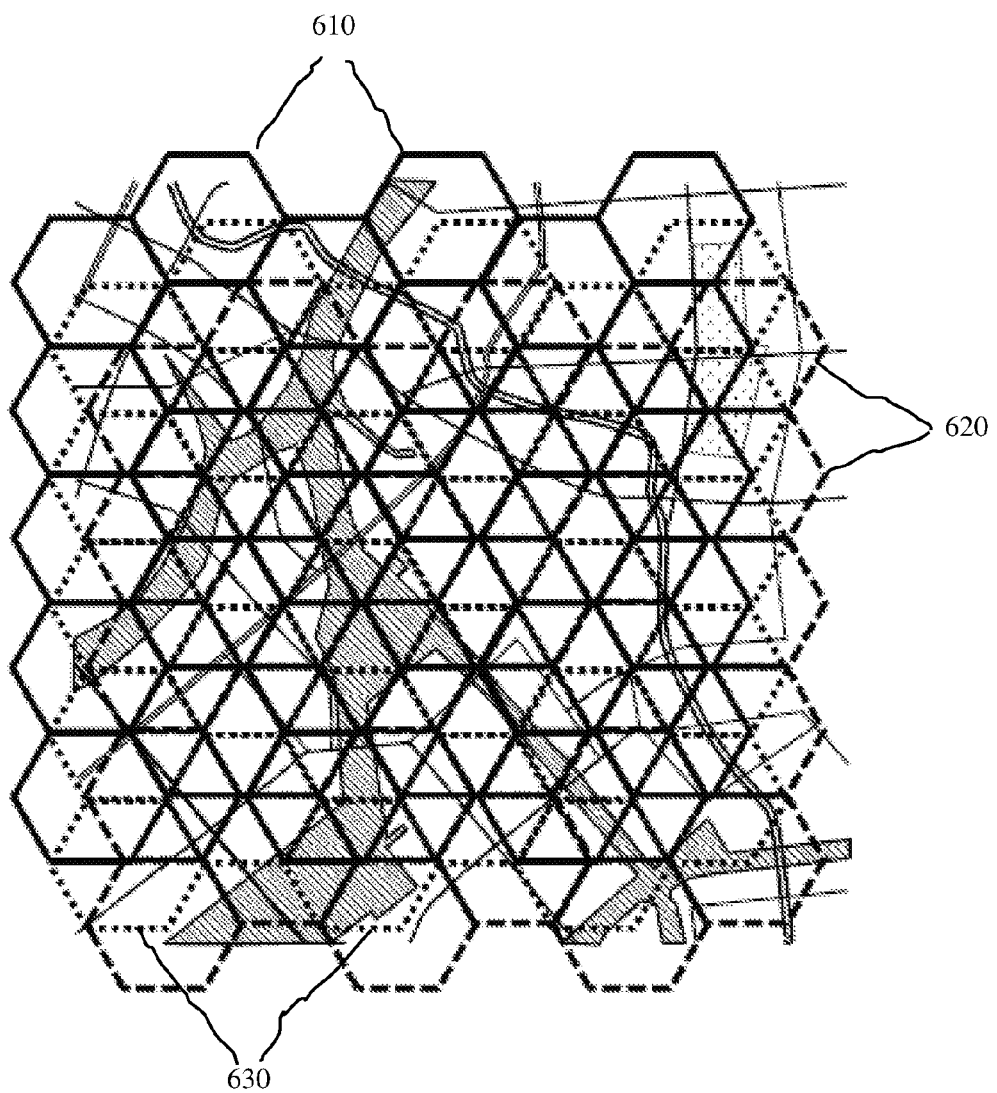
FIG. 6 shows first regions, second regions, and third regions according to another embodiment of the invention.

FIG. 6 shows first regions 610, second regions 620, and third regions 630, according to an embodiment of the present invention. According to the embodiment of FIG. 6, the system has 3 sets of regions and 3 sets of subsystems that manage each of the regions. In particular, the system comprises a plurality of third subsystems respectively operable to manage a plurality of third regions 630 in the geographic space, in addition to the plurality of the first subsystems and the second subsystems, such as in the embodiments of FIGS. 1-5. In other embodiments, the system may have 4 or more sets of regions and corresponding subsystems.

In this embodiment, the plurality of first regions 610, the plurality of second regions 620, and the plurality of third regions 630 are arranged such that each of the third regions 630 covers a border of one or more of the first regions 610 and a border of one or more of the second regions 620. In FIG. 6, the first regions 610 are indicated by normal lines, the second regions 620 are indicated by dashed lines, and the third regions 630 are indicated by dotted lines. As indicated in FIG. 6, the first regions 610, the second regions 620, and the third regions 630 are hexagonal areas. However, in other embodiments, the plurality of regions managed by corresponding subsystems may have other shapes, such as triangles or other polygons.

According to this embodiment, the system is triply redundant by 3 sets of the subsystems, and thus further improves stability of the system in case of a failure or multiple failures.

Figure 7:
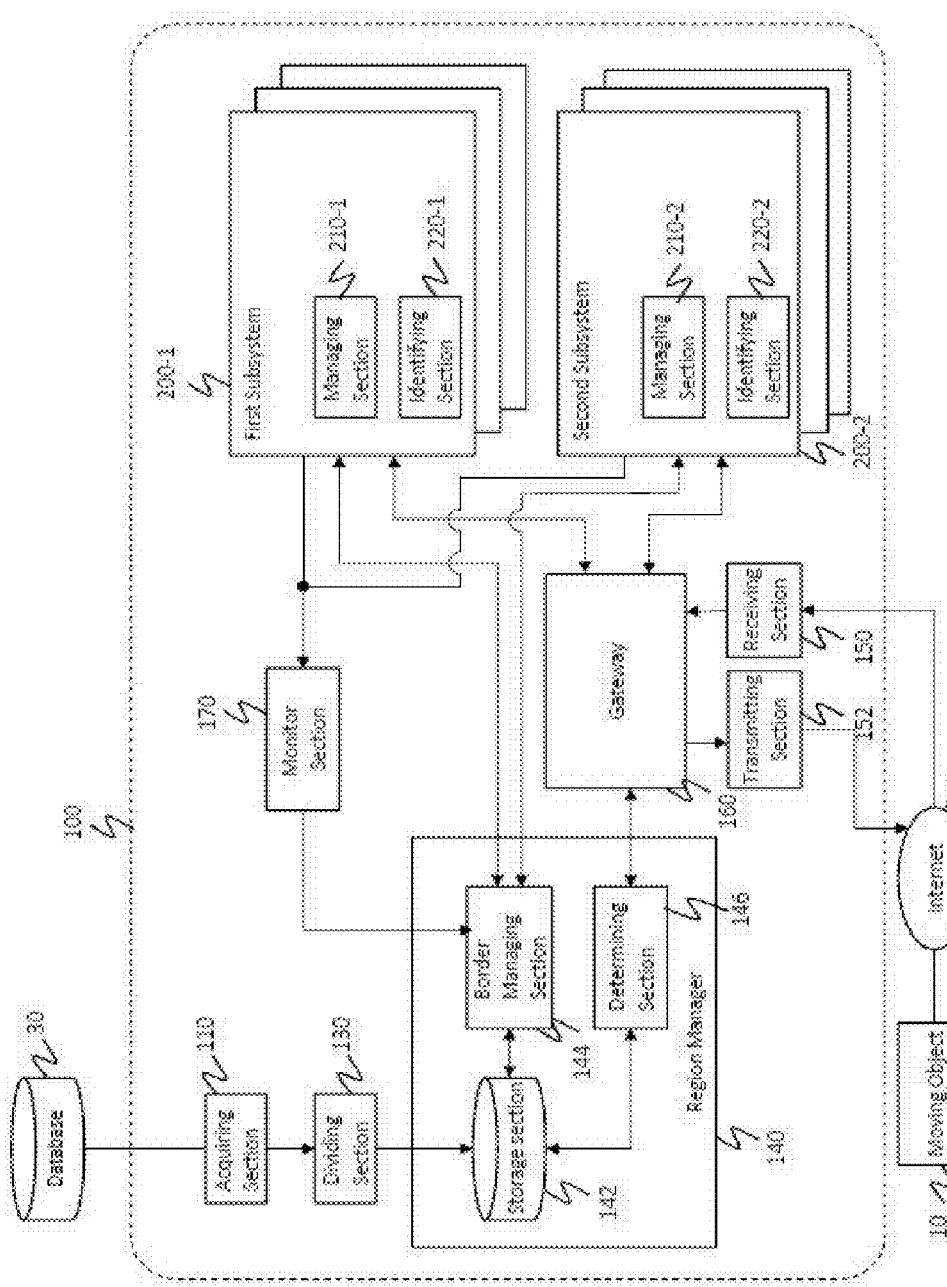
FIG. 7 shows a second exemplary configuration of the system 100 according to the present embodiment.
Figure 8:
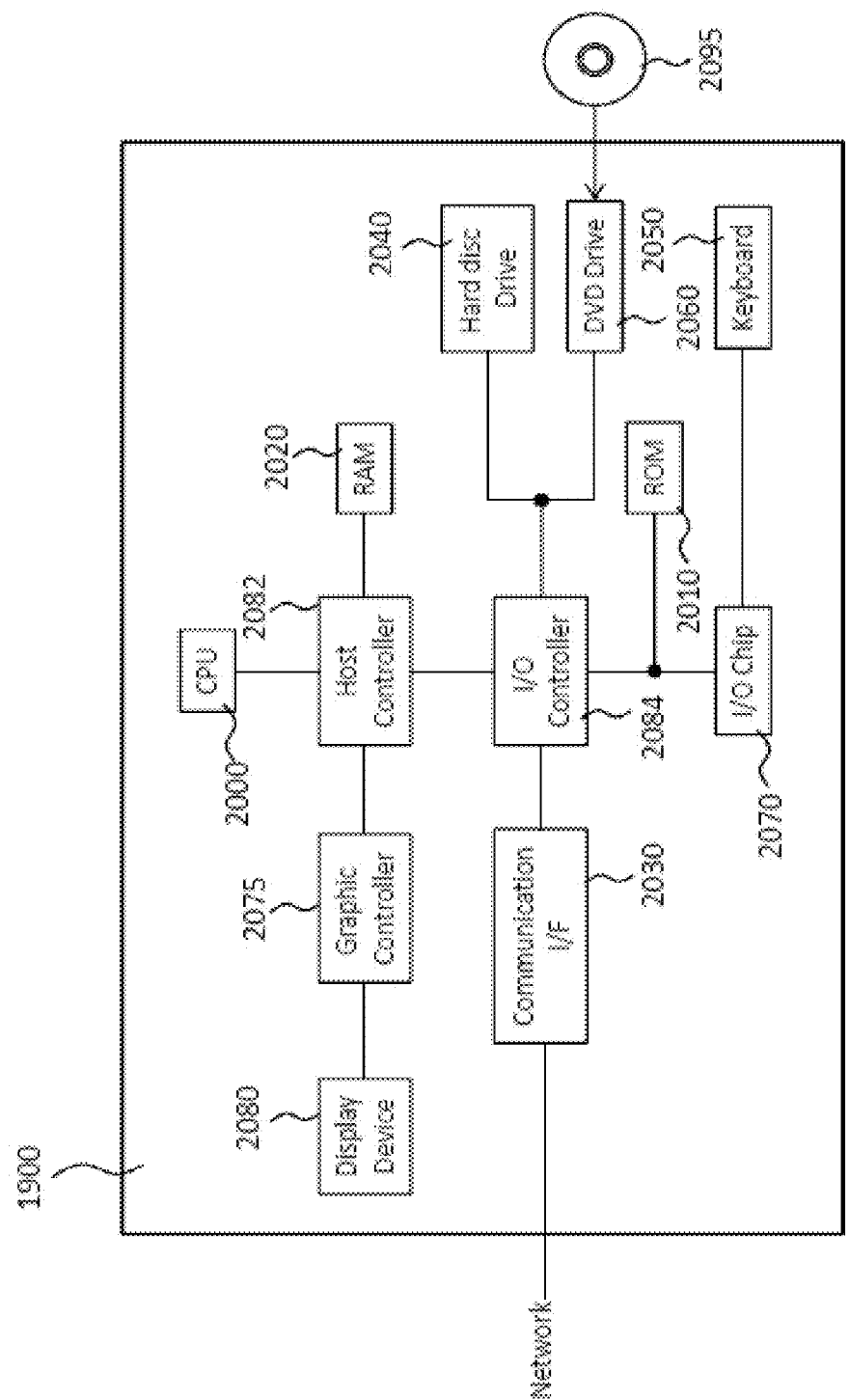
FIG. 8 shows a computer according to an embodiment of the invention.

FIG. 7 shows a second exemplary configuration of the system 100, according to an embodiment of the present invention. The system 100 of the present embodiment dynamically changes the boundary of at least one region to prevent a load imbalance and a decrease in processing capability of the plurality of subsystems 200.

According to this embodiment, the system 100 may further comprise a monitor section 170, and the region manager 140 may further comprises a border managing section 144. Elements common to the embodiment of FIG. 2 may not be explained below because they are substantially the same.

In this embodiment, the region manager 140 may be operable to further adjust the loads of the plurality of subsystems 200 by dynamically changing the boundary of at least one of the plurality of first regions and/or the plurality of second regions. The region manager 140 may adjust the loads of the subsystems 200 by changing the boundary of a first/second region managed by a subsystem 200 whose load is higher than the loads of the other subsystems 200.

The boundary managing section 144 may be operable to communicate with each of the first subsystems 200-1 and second subsystems 200-2, and change the boundary of the first/second region being managed by at least one of the subsystems 200. The boundary managing section 144 may be operable to change the boundary of the first/second region according to information such as the moving objects 10, the routes, and events occurring in each first/second region managed by a subsystem 200, or according to information about the subsystems 200. The boundary managing section 144 may provide instructions for changing the boundary to one or more subsystems 200 adjacent to the boundary being changed. The boundary managing section 144 may communicate with the storage section 142 and update the boundary information of the first/second regions of which the boundary was changed.

The monitoring section 170 may be operable to monitor the loads of each of the subsystems 200. The monitoring section 170 may communicate with the plurality of subsystems 200 and monitor the amount of traffic, the number of moving objects 10, the number of events, the number of roads, and the like in the map area managed by the subsystems 200. The monitoring section 170 may monitor the amount of data processed by each subsystem 200 and the amount of data transmitted and received by each subsystem 200. The monitoring section 170 may monitor the amount of heat generated by each subsystem 200 and the amount of memory used by each subsystem 200. The monitoring section 170 may communicate with the region manager 140 and supply the monitoring results to the region manager 140.

Each subsystem 200 may begin data processing relating to a moving object 10 that is a new management target, in response to the region manager 140 changing the boundary of the management target region. In this case, in response to the change of the boundary, the subsystem 200 for which a new management target, e.g. a map, a moving object 10, an event, etc., has been generated may receive the information concerning this management target from the subsystem 200 that was managing this management target prior to the boundary change. Each subsystem 200 may stop managing the information of a management target in response to receiving information indicating the exclusion of the management target, or in response to supplying information indicating the addition of the management target to another subsystem 200, which may be due to the region manager 140 changing the boundary of the management target region.

The system 100 of the present embodiment described above may manage a map area containing first/second regions obtained by dividing a geographic space for a plurality of subsystems 200, along with moving objects 10 and events positioned within this map area. The region manager 140 dynamically changes the loads of the subsystems 200 by changing the boundary of at least one of the first/second regions according to at least one of the data processing loads relating to the moving objects 10 and the number of moving objects 10 positioned in each of the first/second regions, for example.

In this way, the system 100 can prevent the loads placed on the servers among the subsystems 200 from exceeding the processing capacities of the servers. Furthermore, the system 100 can prevent a decrease in efficiency of the overall system due to a certain server among the subsystems 200 having an overwhelming load.

In the foregoing embodiments, the plurality of first/second regions may all have the same shape. However, other embodiments are possible. In some embodiments, the size of each of the first regions is substantially identical, the size of each of the second regions is substantially identical, and the size of each of the first regions and the size of each of the second regions are different.

In these embodiments, the size of each of the second regions may be larger than the size of each of the first regions. Here, the first regions may be referred to as small regions and the second regions may be referred to as large regions. The second subsystems are operable to execute tasks using information relating to a broader area than tasks executed by the first subsystems. The tasks using information relating to a broader area (referred to as "broad task") may be management of events occurring across a plurality of small regions, such as long backup of cars, bad weather, accumulation of snow and etc. In this embodiment, instead of the first subsystems managing small regions, the second subsystems managing large regions may manage broad tasks, thereby enabling handling events occurring across the plurality of small regions and improving efficiency of the event management.

In the foregoing embodiments, a whole area of a geographic map is redundantly managed by a plurality of subsystems. However, only a part of the geographic space may be redundantly managed by the plurality of sets of subsystems, and another part of the geographic space may be managed by a single set of subsystems.

FIG. 9 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the region manager, the first subsystems 200-1, the second subsystems 200-2 and other element(s) in the system 100 of FIG. 2 and FIG. 7, includes a border managing module, a determining module, a managing module, and an identifying module. The program or module acts on the CPU 2000, to cause the computer 1900 to function as a border managing section, such as border managing section 144, a determining section, such as determining section 146, a managing section, such as a managing section 210-1 and 210-2, an identifying section, such as identifying section 220-1 and 220-2.

The information processing described in these programs is read into the computer 1900, to function as the border managing section, the determining section, the managing section, and the identifying section, which are the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system for managing moving objects.

What is claimed is:

1. A computer program product comprising a non-transitory computer readable storage medium having program instructions embodied therewith, the program instructions executable by a computer to cause the computer to perform operations comprising:
   managing a plurality of first regions in a geographic space by a plurality of first subsystems, wherein the plurality of first subsystems are operable to manage moving objects that travel routes in the plurality of first regions;
   managing a plurality of second regions in the geographic space by a plurality of second subsystems, wherein the plurality of second subsystems are operable to manage moving objects that travel routes in the plurality of second regions;
   a region manager operable to select a main subsystem for managing a moving object from among at least a candidate first subsystem of the plurality of first subsystems and a candidate second subsystem of the plurality of second subsystems based on the location of the moving object within the plurality of first regions managed by the candidate first subsystem and the plurality of second regions managed by the candidate second subsystem; and,
   wherein the plurality of first regions and the plurality of second regions are arranged such that at least one of the plurality of first regions covers a border of at least one of the plurality of second regions and at least of the plurality of second regions covers a border of at least one of the plurality of first regions.

2. The computer program product of claim 1, wherein the plurality of first regions and the plurality of second regions are arranged such that each of plurality of first regions covers a border of at least one of plurality of second regions and each of plurality of second regions covers a border of at least one of plurality of first regions.

3. The computer program product of claim 1, wherein the region manager selects the main subsystem based on the distance between the location of the moving object and the center of a first region of the plurality of first regions managed by the candidate first subsystem relative to the distance between the location of the moving object and the center of a second region of the plurality of second regions managed by the candidate second subsystem.

4. The computer program product of claim 3, wherein the region manager changes the main subsystem to the candidate second subsystem if the center of the second region managed by the candidate second subsystem is the second closest to the location of the moving object and the candidate first subsystem is down.

5. The computer program product of claim 3, wherein the region manager selects the main subsystem based on the distance between the location of the moving object and the border of the first region managed by the candidate first subsystem relative to the distance between the location of the moving object and the border of the second region managed by the candidate second subsystem.

6. The computer program product of claim 1, wherein the region manager further selects the main subsystem based on a travelling direction of the moving object.

7. The computer program product of claim 1, wherein the main subsystem provides the moving object with information that assists the moving object with traveling in the geographic space.

8. The computer program product of claim 1, wherein the size and shape of each of plurality of first regions and each of plurality of second regions are substantially identical.

9. The computer program product of claim 8, wherein plurality of first regions and plurality of second regions are quadrangular areas.

10. The computer program product of claim 8, further comprising a plurality of third subsystems operable to respectively manage a plurality of third regions in the geographic space,
    wherein the plurality of first regions, the plurality of second regions, and the plurality of third regions are arranged such that each of plurality of third regions covers a border of at least one of plurality of first regions and a border of at least one of plurality of second regions.

11. The computer program product of claim 10, wherein plurality of first regions, plurality of second regions, and plurality of third regions are hexagonal areas.

12. The computer program product of claim 1, wherein each of plurality of second regions covers an intersection point of the borders of at least two first regions.

13. The computer program product of claim 1, wherein the size of each of plurality of first regions is substantially identical, the size of each of plurality of second regions is substantially identical, and the size of each of plurality of first regions and the size of each of plurality of second regions are different.

14. The computer program product of claim 13, wherein the size of each of plurality of second regions is larger than the size of each of plurality of first regions, and each second subsystem is operable to execute tasks using information relating to a broader region than tasks executed by each first subsystem.

* * * * *